June 21, 1932.  S. N. BUCHANAN  1,864,292
GROUNDING CLAMP
Filed Dec. 17, 1928  2 Sheets-Sheet 1
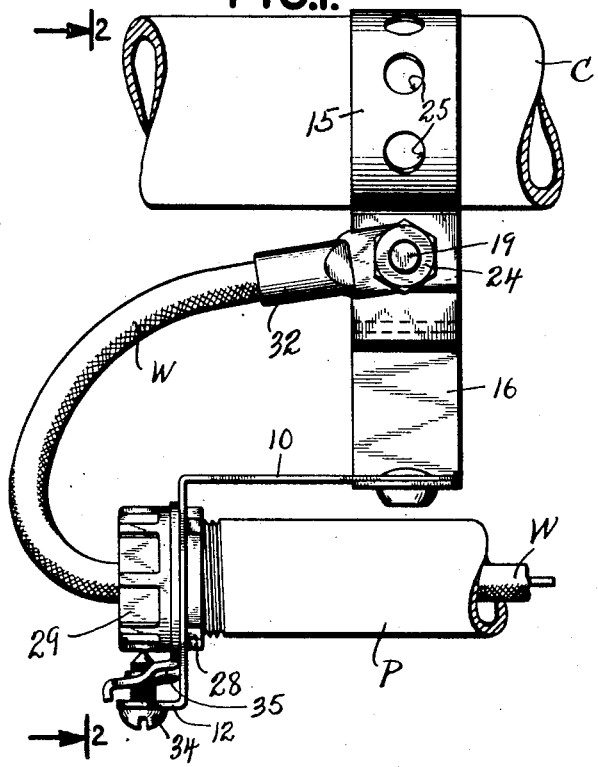
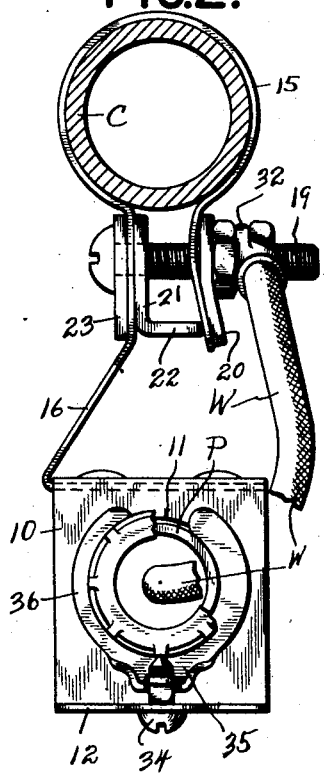
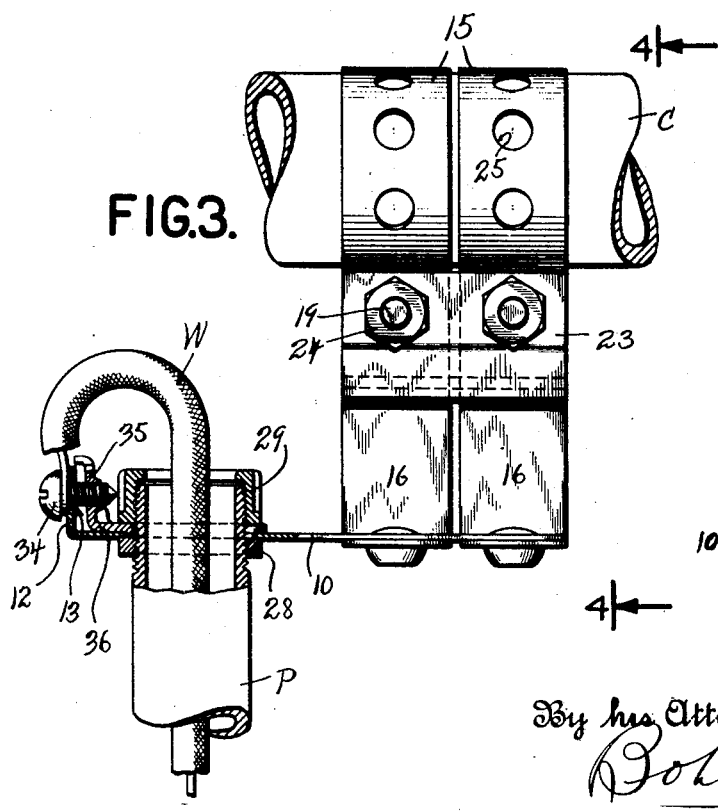
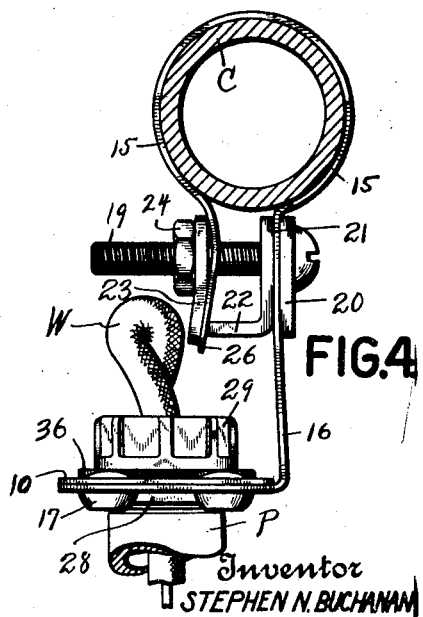
Inventor
STEPHEN N. BUCHANAN
By his Attorneys
Bohleber & Ledbetter

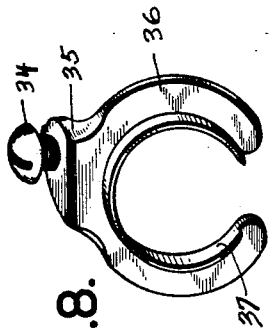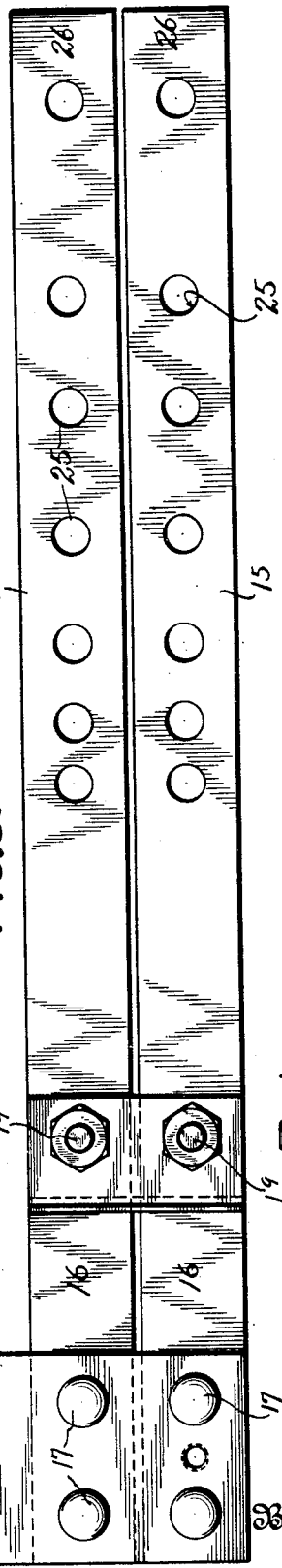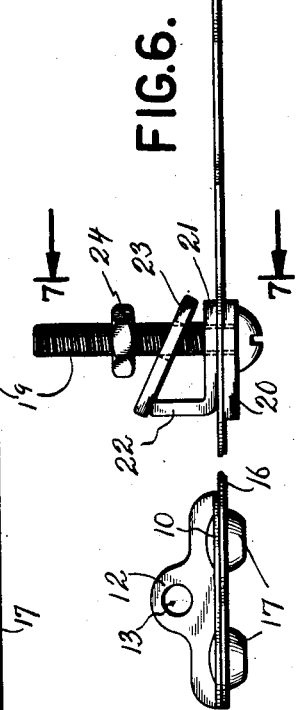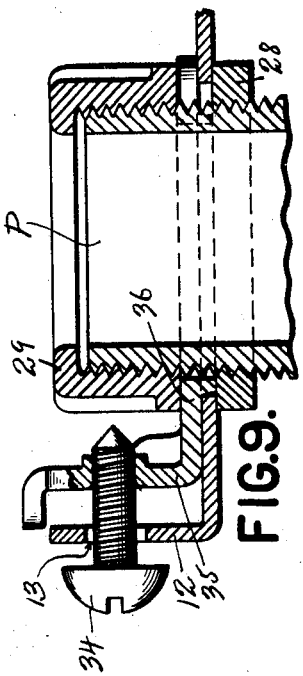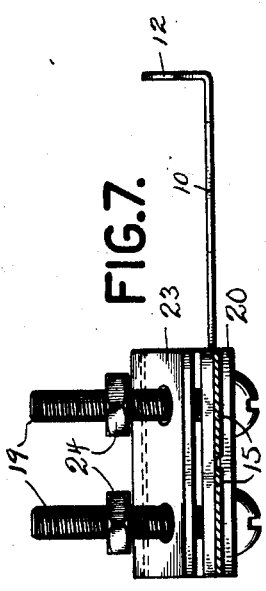

Patented June 21, 1932

1,864,292

UNITED STATES PATENT OFFICE

STEPHEN N. BUCHANAN, OF ELIZABETH, NEW JERSEY, ASSIGNOR TO THE THOMAS & BETTS CO., OF ELIZABETH, NEW JERSEY, A CORPORATION OF NEW JERSEY

GROUNDING CLAMP

Application filed December 17, 1928. Serial No. 326,511.

This invention relates to electrical conduit fittings and more particularly to ground clamps and to electrical grounding connecters for use in positively grounding an electric feed or service wire to a pipe or other suitable grounding device and also for electrically connecting two or more conduits.

An object is to produce a ground clamp which includes a double flexible ground clamping device capable of connecting any two pipes regardless of the position or direction of the pipes and hence regardless of the angular relation between pipes. To this end the ground clamp is universal in its application to pipes extending in any direction.

It is a further object to produce a ground clamp which may be used alone to connect two or more pipes or in combination with another and independent electrical grounding device. In other words my ground clamp invention may be connected with another grounding device to doubly insure a safe installation.

The accompanying drawings show examples of the invention and it is to be understood that certain changes in construction and use may be resorted to without departing from the principle of the invention.

Figure 1 shows a side view of the ground clamp mounted onto parallel pipes; and Figure 2 is an end view thereof as taken on the line 2—2.

Figure 3 shows the ground clamp mounted on pipes which extend at an angle to each other as at right angles; and Figure 4 shows an end view of this construction as taken on the line 4—4.

Figure 5 shows the ground clamp parts flattened out and before the same are mounted on the pipes; and Figure 6 is an end view thereof.

Figure 7 is a section on the line 7—7 of Figure 6.

Figure 8 is a perspective view of a secondary or independent electrical grounding device which may be used with the ground clamp covered in this application.

Figure 9 is a sectional view taken through an end of a pipe on which the clamp is mounted and also shows the use of a second or independent grounding device.

According to the invention there is provided a double flexible ground clamp capable of connecting any two conduits regardless of their parallel or angular relation and the ground clamp includes means flexible on each end thereof for gripping and making electrical contact with the pipes. In other words the ground clamp flexible ends are universal in their adaptation to pipes running in any direction. In this connection there is provided two or more ground clamp straps which are joined together at an angle, the junction preferably occurring at the extremities of the two straps. The extremities opposite this junction include flexible portions adapted to embrace and make electrical connection with conduits containing electrical wiring systems.

Referring further to the drawings there is shown a strap 10 provided with a conduit receiving opening or hole 11. That extremity of the strap which is proximate the hole 11 may to advantage be made flexible so that the strap may be bent at right angles upon itself if necessary. On the outer end of the strap 10 beyond the hole 11 there is formed an upturned ear 12 which is provided with a loose screw receiving aperture 13. The other end of the strap 10 is adapted to be joined with the other section or the second strap members forming the ground clamp structure as will now be described.

A second strap or straps 15 has its end or ends anchored to the strap 10 as by rivets 17 or other suitable means. The junction of the two straps, as made by the rivets 17, is preferably at an angle so that two straps 10 and 15 are disposed at right angles to each other. This construction enables the ground clamp to be bent into any universal shape or form by which to ground and connect two pipes or electrical conduits regardless of their position, i. e. the universal clamp may be shaped to connect pipes which extend parallel as in Figure 1 or which run at an angle to each other as in Figure 3, and this shaping is of course done by the hand of the mechanic at the time he mounts the ground clamp.

While the drawings show two straps 15 in Figure 5 and one strap in Figure 1, it is appreciated that any suitable number of straps may be employed. In this connection the outer free end of the strap 15, which is opposite the junction end 17, is flexible and this may also be true of the entire strap section 15. It is important, however, that the outer free end of the strap 15 be flexible in order that it may be wrapped around and embrace an electrical conduit or pipe.

One or more clamp bolts and nuts 19 and 24 are carried by the strap 15 at a point proximate the strap juncture 17. A reenforcement plate 20 and 21 may to advantage be mounted on each side of the strap 15, one under the head of the clamp or bolt screw 19 and the other threaded or screwed down on the shank of the bolt 19. In this way the bolt 19 is rigidly secured to the body of the strap 15 and held in fixed position by the two reenforcement plates 20 and 21 which hold the clamp bolt 19 in upright position on the strap 15. One of the reenforcement plates is made with an upturned supporting lug 22 on which one edge of a loosely fitting plate washer 23 rests, the washer 23 being loosely confined on the bolt or bolts 19 under a clamp nut 24 thereof.

The outer flexible end 26 of the strap 15 is provided with holes 25 through which the clamp bolt 19 is inserted. The outer perforated flexible strap end 26 is wrapped around a pipe and one of the holes 25 is inserted over the clamp bolt 19 and under the washer 23 whereupon the nut 24 and washer 23 are run down tightly against the strap which binds it with great force about the circumference of the pipe and establishes a gripping electrical ground connection therewith. The outer free end 26 of the strap rests on the upper edge of the lug 22 as shown in Figures 2 and 4 and as the nut is screwed down on the bolt 19, the tilting edge of the plate washer 23 impresses a powerful stretching force on the clamp strap 15 to tightly embrace it about a conduit C. Also the washer 23 prevents the nut 24 from cutting into the ground clamp strap.

The other end of the ground clamp, i. e. the strap 10 is mounted on the end of a pipe or conduit P by inserting the latter through the hole 11 whereupon a nut 28 supports the strap 10 and a bushing and jam nut 29 is then screw fastened onto the outer end of the pipe to positively clamp the strap 10 between the two nuts and to thereby make electrical connection between the strap and pipe. Hence the strap 10 is electrically connected to one of the pipes, the strap 15 to the other, and the two straps 10 and 15 are joined at an angle by the rivet means 17.

Ordinarily the two ground straps 10 and 15 are made of soft malleable sheet metal so that the ground clamp may be bent to universally adapt it to all manner of work and conduits encountered. At any rate it is necessary to have the outer end portions of the two straps, which are remote from the riveted angular junction ends 17, formed of flexible metal of good electrical contacting and conducting quality so that positive electrical ground connections may be made at the portions 11 and 26 of the ground clamp. In this way the ground clamp 10—15 may be mounted on parallel pipes as in Figure 1 by bending the strap 10 at right angles upon itself adjacent the pipe hole 11. On the other hand the ground clamp may be mounted on angularly disposed pipes as shown in Figure 3 by leaving the strap 10 in a straight position.

In addition to the foregoing it is frequently necessary to electrically connect the specially provided ground wires W contained in one or the other conduits P and/or C to the ground clamp or to the pipe or pipes. In this connection the ground wire W is lead out through the bushing nut 29 and is fastened under the clamp nut 24 threaded onto the clamp bolt 19. In fact a wire terminal 32 on the wire W may be screw fastened to any part of the ground strap 10—15.

On the other hand in some electrical installations as in Figure 3 the special ground wire W may be bent back on itself and fastened under a screw 34 which passes freely through the screw hole 13 and threads into the head 35 of a special type of grounding device 36 shown in Figure 8. This grounding device 36 is formed with the head 35 and is ordinarily fitted with a contact and pressure exerting screw 34 and includes a sleeve portion 37 which is adapted to fit into the hole 11 of the ground clamp strap 10.

The segmental grounding device 36 is mounted to embrace the pipe P and is adapted to undergo a slight lateral pressure movement at right angles to the axis of the pipe due to the force applied thereagainst by the screw 34. The point of the screw 34 burrs against the nut 29 thereby establishing positive electrical contact between this nut and the screw 34 and the screw head makes positive electrical connection with the bare end of the wire W. The pressure exerted by the sleeve portion 37 within the strap hole 11 tends to expand the flange sleeve portion 37 within the hole 11 and thus very positively establish electrical connection between the parts.

While I have shown in several of the views the adaptation of the special grounding device 36 to the strap opening 11, it is to be noted that the ground clamp may be used without the special grounding device 36 for the reason that the lock nut 28 and jam nut 29 may be so snugly tightened up against the strap 10 adjacent its opening 11 that positive electrical connection will be made. However, the special ground clamp shown in Figure 8 is advantageously used in conduit and clamp assemblies of this nature.

Referring to Figure 2 it is also clearly apparent that the grounding wire W does not necessarily have to be connected to the clamp screw 34 and device 36 as in Figure 3 for indeed the wire W may be grounded to the bolt 19 whether or not the special grounding device 36 is employed. In other words the grounding device 36 may or may not be used to establish a direct connection with the wire W. In either event the screw 34 is tightened up against the jam nut 29 to make electrical connection therewith and hence the pipe P and then if it is desired to insert the bare end of the wire W under the screw 34 the same can be readily accomplished. The ear 12 gives or bends for the purpose of admitting the screw 34 to reach its seat against the nut 29.

I have therefore provided a ground clamp which is adapted to all pipe or conduit installations and which may be applied to all manner of conduit assemblies regardless of the directions thereof. The several wire connecting bolts or screws 34 and 19 provide readily accessible means for attaching the ground wire W to some part of the assembly. Likewise the flexible strap ends 26 and apertured end 11 fully connect two or more pipes and hence grounds them in the system. The device fills a want long felt for a universal type of grounding connecter and fitting.

What I claim is:

A grounding clamp comprising a first flexible strap having a flexible portion and the end of the strap beyond the flexible portion being bendable around a pipe forming attaching means, a second flexible strap joined with the first strap with their axes at an angle to each other, and an opening upon the end of the second strap to receive a pipe end and spaced from the joining point of the two straps to leave a flexible portion therebetween, the end of the second strap having the opening being bendable at any angle with respect to the strap.

In testimony whereof I affix my signature.

STEPHEN N. BUCHANAN.